(12) United States Patent
Mahesh et al.

(10) Patent No.: US 9,065,682 B2
(45) Date of Patent: Jun. 23, 2015

(54) WIRELESS HD MAC FRAME FORMAT

(75) Inventors: Kumar Mahesh, San Ramon, CA (US); Karthik Krishnaswami, San Jose, CA (US); Karen Wang, Palo Alto, CA (US); Jeffrey M. Gilbert, Palo Alto, CA (US); Chuen-Shen Shung, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 1722 days.

(21) Appl. No.: 11/981,935

(22) Filed: Oct. 31, 2007

(65) Prior Publication Data

US 2008/0192726 A1    Aug. 14, 2008

Related U.S. Application Data

(60) Provisional application No. 60/856,104, filed on Nov. 1, 2006, provisional application No. 60/873,759, filed on Dec. 8, 2006, provisional application No. 60/901,388, filed on Feb. 14, 2007, provisional application No. 60/901,384, filed on Feb. 14, 2007, provisional application No. 60/920,338, filed on Mar. 26, 2007, provisional application No. 60/920,266, filed on Mar. 26, 2007, provisional application No. 60/920,357, filed on Mar. 26, 2007.

(51) Int. Cl.
*H04L 12/64* (2006.01)
*H04L 29/06* (2006.01)

(52) U.S. Cl.
CPC ..... *H04L 12/6418* (2013.01); *H04L 2012/6448* (2013.01); *H04L 65/607* (2013.01)

(58) Field of Classification Search
USPC .................................................. 370/312–342
See application file for complete search history.

(56) References Cited

U.S. PATENT DOCUMENTS

| | | | |
|---|---|---|---|
| 6,570,890 B1 | 5/2003 | Keenan et al. | |
| 6,934,752 B1 | 8/2005 | Gubbi | |
| 7,701,975 B1 * | 4/2010 | Tsang et al. | 370/474 |
| 2001/0037388 A1 * | 11/2001 | Suzuki | 709/225 |
| 2003/0185169 A1 * | 10/2003 | Higgins | 370/329 |
| 2003/0185241 A1 * | 10/2003 | Lu et al. | 370/476 |
| 2004/0170121 A1 | 9/2004 | Kim et al. | |
| 2005/0135310 A1 * | 6/2005 | Cromer et al. | 370/331 |
| 2005/0177639 A1 * | 8/2005 | Reunamaki et al. | 709/227 |
| 2005/0213554 A1 * | 9/2005 | Ginzburg et al. | 370/349 |
| 2005/0265298 A1 * | 12/2005 | Adachi et al. | 370/338 |
| 2006/0116147 A1 * | 6/2006 | Hashizume | 455/515 |

(Continued)

OTHER PUBLICATIONS

PCT International Search Report dated Sep. 16, 2008, for PCT Patent Application No. PCT/US07/023125 filed Nov. 1, 2007, 5 Pages.
Written Opinion of the International Searching Authority dated Sep. 16, 2008, for PCT Patent Application No. PCT/US07/023125, filed Nov. 1, 2007, 7 Pages.

*Primary Examiner* — Brandon Renner
(74) *Attorney, Agent, or Firm* — Fenwick & West LLP

(57) ABSTRACT

A media access controller (MAC) generates a composite packet having an optimized format for carrying audio, video, and data traffic. A header portion of the composite packet is encoded separately from a data portion of the composite packet. A physical device interface (PHY) is coupled to the MAC. The PHY encodes and decodes between a digital signal and a modulated analog signal. The PHY comprises a high rate physical layer circuit (HRP) and a low rate physical layer circuit (LRP). A radio frequency (RF) transmitter is coupled to the PHY to transmit data.

23 Claims, 7 Drawing Sheets

(56) References Cited

U.S. PATENT DOCUMENTS

| | | | |
|---|---|---|---|
| 2006/0126492 A1* | 6/2006 | Hyun et al. | 370/208 |
| 2006/0215774 A1* | 9/2006 | Shor | 375/260 |
| 2006/0251115 A1* | 11/2006 | Haque et al. | 370/466 |
| 2007/0014273 A1* | 1/2007 | Kuperschmidt et al. | 370/347 |
| 2007/0015544 A1* | 1/2007 | Garrett et al. | 455/562.1 |
| 2007/0160003 A1* | 7/2007 | Meier | 370/329 |
| 2007/0270115 A1* | 11/2007 | Kravets | 455/283 |
| 2008/0049707 A1* | 2/2008 | Kwon et al. | 370/343 |

* cited by examiner

WIRELESS HD MAC FRAME FORMAT

RELATED APPLICATIONS

This application claims the benefit of U.S. Provisional Application No. 60/856,104 filed Nov. 1, 2006, U.S. Provisional Application No. 60/873,759 filed Dec. 8, 2006, U.S. Provisional Application No. 60/901,388 filed Feb. 14, 2007, U.S. Provisional Application No. 60/901,384 filed Feb. 14, 2007, U.S. Provisional Application No. 60/920,338 filed Mar. 26, 2007, U.S. Provisional Application No. 60/920,266 filed Mar. 26, 2007, U.S. Provisional Application No. 60/920,357 filed Mar. 26, 2007.

FIELD OF THE INVENTION

The present invention relates to the field of wireless communication; more particularly, the present invention relates to a wireless communication device.

BACKGROUND OF THE INVENTION

In 1998, the Digital Display Working Group (DDWG) was formed to create a universal interface standard between computers and displays to replace the analog VGA connection standard. The resulting standard was the Digital Visual Interface (DVI) specification, released in April 1999. There are a number of content protection schemes available. For example, HDCP and DTCP are well-known content protection schemes. HDCP was proposed as a security component for DVI and was designed for digital video monitor interfaces.

HDMI is a connection interface standard that was developed to meet the explosive demand for high-definition audio and video. HDMI is capable of carrying video and audio and is backward-compatible with DVI (which carries only video signals). The key advantage of DVI and HDMI is that both of them are capable of transmitting uncompressed high-definition digital streams via a single cable.

HDCP is a system for protecting content being transferred over DVI and HDMI from being copied. See HDCP 1.0 for details. HDCP provides authentication, encryption, and revocation. Specialized circuitry in the playback device and in the display monitor encrypts video data before it is sent over. With HDCP, content is encrypted immediately before (or inside) the DVI or HDMI transmitter chip and decrypted immediately after (or inside) the DVI or HDMI receiver chip.

In addition to the encryption and decryption functions, HDCP implements authentication to verify that the receiving device (e.g., a display, a television, etc.) is licensed to receive encrypted content. Re-authentication occurs approximately every two seconds to continuously confirm the security of the DVI or HDMI interface. If, at any time, re-authentication does not occur, for example by disconnecting a device and/or connecting an illegal recording device, the source device (e.g., a DVD player, a set-top box, etc.) ends transmission of encrypted content.

While discussions of HDMI and DVI are generally focused on wired communication, the use of wireless communication to transmit content has become more prevalent every day. While much of the current focus is on cellular technologies and wireless networks, there has been a growing interest in the unlicensed spectrum around 60 GHz for wireless video transmission or very high-speed networking. More specifically, seven GHz of contiguous bandwidth has been opened for unlicensed use at millimeter-wave frequencies around 60 GHz in the U.S. and Japan.

SUMMARY OF THE INVENTION

A media access controller (MAC) generates a composite packet having an optimized format for carrying audio, video, and data traffic. A physical device interface (PHY) is coupled to the MAC. The PHY to encode and decode between a digital signal and a modulated analog signal. The PHY comprises a high rate physical layer circuit (HRP) and a low rate physical layer circuit (LRP). A radio frequency (RF) transmitter is coupled to the PHY to transmit data.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

An apparatus and method for wireless communication is disclosed. In one embodiment, the wireless communication occurs using a wireless transceiver with or without an adaptive beamforming antenna. As would be apparent to one skilled in the art, the wireless communication could occur with a wireless receiver or transmitter.

A media access controller (MAC) generates a composite packet having an optimized format for carrying audio, video, and data traffic. A physical device interface (PHY) is coupled to the MAC. The PHY to encode and decode between a digital signal and a modulated analog signal. The PHY comprises a high rate physical layer circuit (HRP) and a low rate physical layer circuit (LRP). A radio frequency (RF) transmitter is coupled to the PHY to transmit data.

In one embodiment, the wireless communication includes an additional link, mode, or channel, for transmitting information between a transmitter and a receiver. The link may be uni-directional or bi-directional. In one embodiment, the channel is used to send antenna information back from a receiver to a transmitter to enable the transmitter to adapt its antenna array by steering the antenna elements to find a path to another direction. This may be obstacle avoidance.

In one embodiment, the link is also used to transfer information corresponding to the content that is being transferred wirelessly (e.g., wireless video). This information may be content protection information. For example, in one embodiment, the link is used to transfer encryption keys and acknowledgements of encryption keys when the transceivers are transferring HDMI data. Thus, in one embodiment, the link transfers control information and content protection information.

Figure 1:
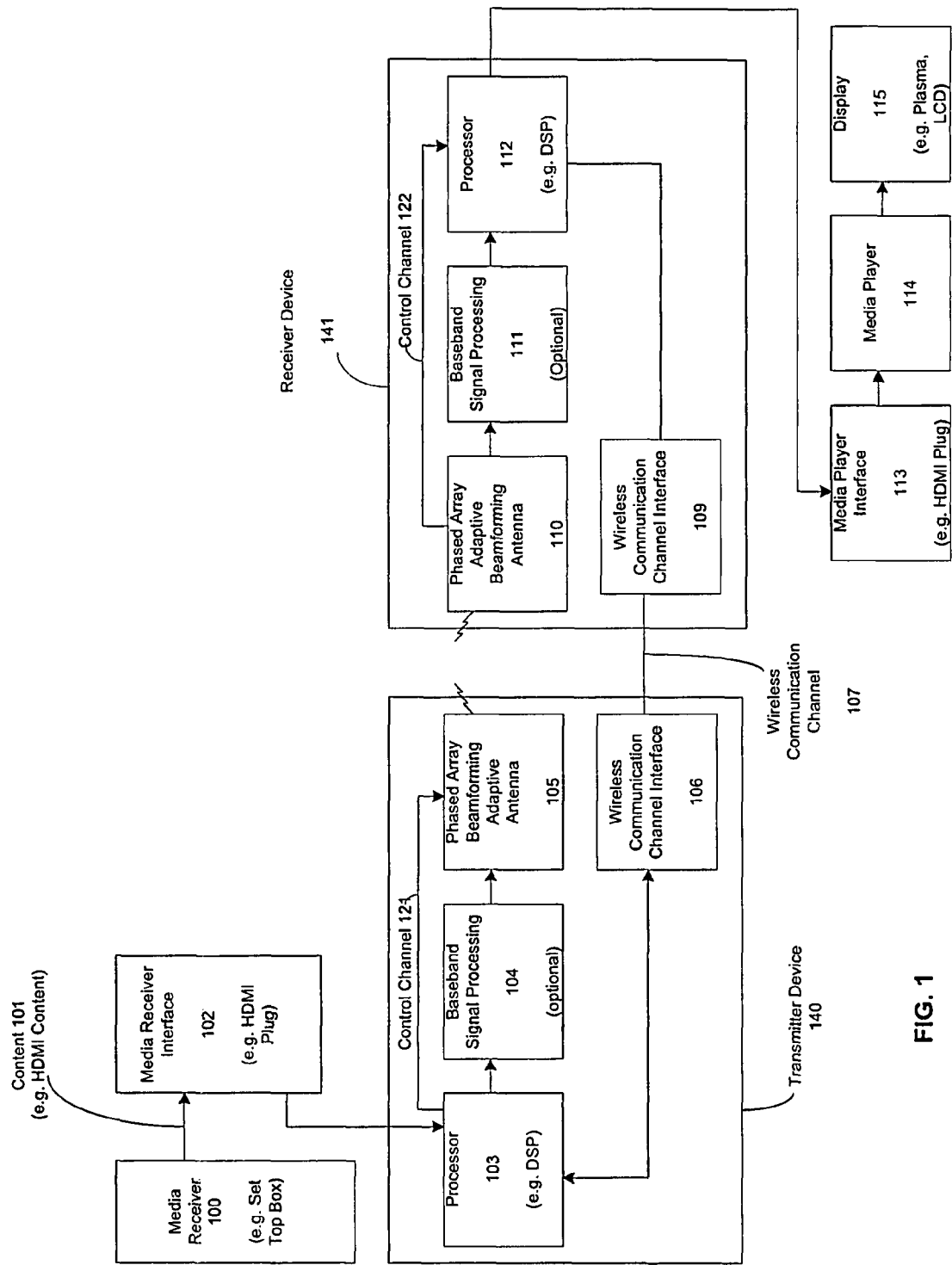
FIG. 1 is a block diagram of one embodiment of a communication system.

FIG. 1 is a block diagram of one embodiment of a communication system. Referring to FIG. 1, the system comprises media receiver 100, a media receiver interface 102, a transmitting device 140, a receiving device 141, a media player interface 113, a media player 114 and a display 115.

Media receiver 100 receives content from a source (not shown). In one embodiment, media receiver 100 comprises a high-definition source, for example, such as a set top box. The content may comprise baseband digital video, such as, for example, but not limited to, content adhering to the HDMI or DVI standards. In such a case, media receiver 100 may include a transmitter (e.g., an HDMI transmitter) to forward the received content.

Media receiver 100 sends content 101 to transmitter device 140 via media receiver interface 102. In one embodiment, media receiver interface 102 includes logic that converts content 101 into HDMI content. In such a case, media receiver interface 102 may comprise an HDMI plug and content 101 is sent via a wired connection; however, the transfer could occur through a wireless connection. In another embodiment, content 101 comprises DVI content.

In one embodiment, the transfer of content 101 between media receiver interface 102 and transmitter device 140 occurs over a wired connection; however, the transfer could occur through a wireless connection.

Transmitter device 140 wirelessly transfers information to receiver device 141 using two wireless connections. One of the wireless connections is through a phased array antenna with adaptive beamforming, also referred as High Rate Channel. The other wireless connection is via wireless communications channel 107, referred to herein as the Low Rate channel. In another embodiment, the HR and LR wireless communication are enabled through a MAC, and a PHY (discussed in FIG. 2).

Receiver device 141 transfers the content received from transmitter device 140 to media player 114 via media player interface 113. In one embodiment, the transfer of the content between receiver device 141 and media player interface 113 occurs through a wired connection; however, the transfer could occur through a wireless connection. In one embodiment, media player interface 113 comprises an HDMI plug. Similarly, the transfer of the content between media player interface 113 and media player 114 occurs through a wired connection; however, the transfer could occur through a wireless connection.

Media player 114 causes the content to be played on display 115. In one embodiment, the content is HDMI content and media player 114 transfer the media content to display via a wired connection; however, the transfer could occur through a wireless connection. Display 115 may comprise a plasma display, an LCD, a CRT, etc.

Note that the system in FIG. 1 may be altered to include a DVD player/recorder in place of a DVD player/recorder to receive, and play and/or record the content.

In one embodiment, transmitter 140 and media receiver interface 102 are part of media receiver 100. Similarly, in one embodiment, receiver 141, media player interface 113, and media player 114 are all part of the same device. In an alternative embodiment, receiver 140, media player interface 113, media player 114, and display 115 are all part of the display.

In one embodiment, transmitter device 140 comprises a processor 103, a baseband processing component 104, a phased array antenna 105, and a wireless communication channel interface 106. Phased array antenna 105 comprises a radio frequency (RF) transmitter having a digitally controlled phased array antenna coupled to and controlled by processor 103 to transmit content to receiver device 141 using adaptive beamforming.

In one embodiment, receiver device 141 comprises a processor 112, a baseband processing component 111, a phased array antenna 110, and a wireless communication channel interface 109. Phased array antenna 110 comprises a radio frequency (RF) transmitter having a digitally controlled phased array antenna coupled to and controlled by processor 112 to receive content from transmitter device 140 using adaptive beamforming.

In one embodiment, processor 103 generates signals that are processed by baseband signal processing 104 prior to being wirelessly transmitted by phased array antenna 105. In such a case, receiver device 141 includes baseband signal processing to convert analog signals received by phased array antenna 110 into baseband signals for processing by processor 112. In one embodiment, the baseband signals are orthogonal frequency division multiplex (OFDM) signals. In one embodiment, the baseband signals are single carrier phase, amplitude, or both phase and amplitude modulated signals.

In one embodiment, transmitter device 140 and/or receiver device 141 are part of separate transceivers.

Transmitter device 140 and receiver device 141 perform wireless communication using phased array antenna with adaptive beamforming that allows beam steering. Beamforming is well known in the art. In one embodiment, processor 103 sends digital control information to phased array antenna 105 to indicate an amount to shift one or more phase shifters in phased array antenna 105 to steer a beam formed thereby in a manner well-known in the art. Processor 112 uses digital control information as well to control phased array antenna 110. The digital control information is sent using control channel 121 in transmitter device 140 and control channel 122 in receiver device 141. In one embodiment, the digital control information comprises a set of coefficients. In one embodiment, each of processors 103 and 112 comprises a digital signal processor.

Wireless communication link interface 106 is coupled to processor 103 and provides an interface between wireless communication link 107 and processor 103 to communicate antenna information relating to the use of the phased array antenna and to communicate information to facilitate playing the content at another location. In one embodiment, the information transferred between transmitter device 140 and receiver device 141 to facilitate playing the content includes encryption keys sent from processor 103 to processor 112 of receiver device 141 and one or more acknowledgments from processor 112 of receiver device 141 to processor 103 of transmitter device 140.

Wireless communication link 107 also transfers antenna information between transmitter device 140 and receiver device 141. During initialization of the phased array antennas 105 and 110, wireless communication link 107 transfers information to enable processor 103 to select a direction for the phased array antenna 105. In one embodiment, the information includes, but is not limited to, antenna location information and performance information corresponding to the antenna location, such as one or more pairs of data that include the position of phased array antenna 110 and the signal strength of the channel for that antenna position. In another embodiment, the information includes, but is not limited to, information sent by processor 112 to processor 103 to enable processor 103 to determine which portions of phased array antenna 105 to use to transfer content.

When the phased array antennas 105 and 110 are operating in a mode during which they may transfer content (e.g., HDMI content), wireless communication link 107 transfers an indication of the status of communication path from the processor 112 of receiver device 141. The indication of the status of communication comprises an indication from processor 112 that prompts processor 103 to steer the beam in another direction (e.g., to another channel). Such prompting may occur in response to interference with transmission of portions of the content. The information may specify one or more alternative channels that processor 103 may use.

In one embodiment, the antenna information comprises information sent by processor 112 to specify a location to which receiver device 141 is to direct phased array antenna 110. This may be useful during initialization when transmitter device 140 is telling receiver device 141 where to position its antenna so that signal quality measurements can be made to identify the best channels. The position specified may be an exact location or may be a relative location such as, for example, the next location in a predetermined location order being followed by transmitter device 140 and receiver device 141.

In one embodiment, wireless communications link 107 transfers information from receiver device 141 to transmitter device 140 specifying antenna characteristics of phased array antenna 110, or vice versa. These antenna characteristics may include phase and/or magnitude vectors used for steering the beam.

Figure 2:
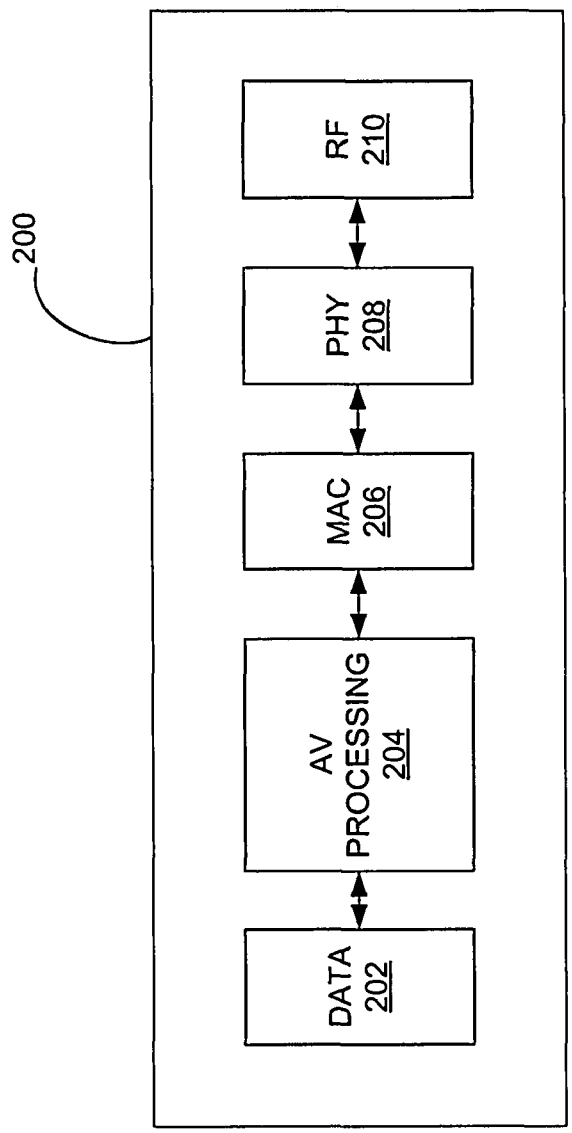
FIG. 2 is a block diagram of one embodiment of a communication device.

FIG. 2 illustrates one embodiment of a communication device 200. The communication device 200 includes data storage 202, an Audio/Video (AV) processor 204, a media access controller (MAC) 206, a physical device interface (PHY) 208, and a radio module 210. Data storage 202 may store any types of data. For example, data storage 202 may store audio and video data as well as other types of data. AV processor 204 receives and processes data from data storage 202. MAC 206 handles generating and parsing physical frames. PHY 208 handles how this data is actually moved to/from the radio module 210. As an example, Wireless HD specification supports two basic types of PHY: high rate PHY (HRP) and low rate PHY (LRP).

In accordance with one embodiment, HRP supports multi-Gbps data rates. HRP may operate in a directional mode (typically beam-formed mode). HRP may be used to transmit audio, video, data, and control messages. In one embodiment, HRP occupies roughly 1.7 GHz bandwidth.

In accordance with one embodiment, LRP supports multi-Mbps data rates. LRP may operate in a directional, omni-directional, or beam-formed modes. In one embodiment, LRP may be used to transmit control and data messages, beacons, and acknowledgements. In an alternative embodiment, LRP may further be used to transmit audio or compressed video. In yet another embodiment, LRP may further be used to transmit low-speed data. In one embodiment, LRP occupies one of three 91 MHz sub-channels within HRP channel.

Packet Format Optimized for AV Centric Network Traffic

The composite packet format can be optimized for Audio/Video network traffic. Some of the characteristics of the composite packet include a flexible packet format optimized for AV traffic, with an efficient ACK format. These features in more detail below.

First, the composite packet format is flexible enough to carry mixed audio, video, and data traffic with a packet payload containing up to 7 sub-packets. The flexible packet format is efficient with reducing overhead by having a common PHY and MAC header for the 7 sub-packets.

One usage of a Wireless Video Area Network (WVAN) is for the high data-rate streaming of uncompressed audio and video along with a small amount of data and control traffic. The composite packet format is designed to support all traffic types with efficiency and flexibility while meeting the different data rate and level of error-protection required by each traffic type.

The composite packet format combines both MAC and PHY constructs. The MAC payload contains up to 7 sub-packets to carry traffic of the same type or traffic of mixed types. All sub-packets in the composite packet share a common PHY and MAC header, hence reduce the overhead of packetizing aggregate traffic and increase network efficiency.

For a WVAN carrying a large amount of video traffic, and a small amount of audio, data and control traffic, the sub-packets can be optimized to have up to 4 video sub-packets and 1 sub-packet each for audio, data, and control type. Each sub-packet can be transmitted using different Modulation Coding Scheme (MCS) allowing the flexibility of selecting an MCS based on the data rate and the level of robustness required by the type of traffic. For example, video traffic requires large throughput whereas audio, data and control traffic require small throughput. The audio traffic has less error tolerance than video traffic, because humans are more sensitive to impairment in audio quality than video quality. The different sub-packets allow the audio/data/control traffic transmitted using lower data rate and more robust MCS, and video using higher data rate and less reliable MCS.

Second, the composite packet format can be optimized for Audio/Video network traffic by modifying the header portion and the data portion. The audio and video traffic are treated as two parts: the header containing important control information for the synchronization and reconstruction of audio and video at the receiver, and the data containing the actual media content. The audio and video headers must be received correctly at the receiver, and therefore require strong protection against errors. The audio data must be well protected since single bit errors in audio data can be objectionable, but in some cases, the video data can be less strongly protected since single bit errors can sometimes be tolerated visually. Thus, the video data may be sent in the sub-packets using a faster data rate with less reliable MCS, but the video header is included in the MAC header transmitted using the most reliable MCS. The amount of audio traffic is small relative to video traffic, and also audio traffic can be more sensitive to errors than the video traffic, and thus the audio traffic can be sent using slower and more robust data rate. For efficiency and not to increase the MAC header length, the audio header is transmitted with the data in the audio sub-packet since both the audio data and header could have similar sensitivity to errors. Again, the header portion and the data portion of video and audio traffic are considered separately, given that the header is smaller in size. For example, the video header is transmitted in the MAC header, separate from the video data. The audio header is transmitted with the audio data, because audio data is inherently transmitted using strong enough error protection.

Third, the composite packet format includes an ACK format that is reliable for audio and video and is, efficient. The ACK for the composite packet is optimized for the audio and video transmission using the least number of bits. Since the video sub-packets are large, one ACK bit is necessary for each video sub-packet, so not to increase the video packet error rate (PER). Since the audio, data, and control sub-packets are relative short, the acknowledgement for the 3 sub-packets can be combined into one ACK bit, without increasing the PER.

In a preferred embodiment, the ACK bits can be assigned and shared between the various subsets of the sub-packets in a flexible manner.

In one embodiment, each sub-packet has its own Cyclic Redundancy Check (CRC) to which can be used to determine if the data is received correctly. In another embodiment, a pair of Cyclic Redundancy Checks (CRCs) for each sub-packet can be used to allow more precise error-checking. Separate most significant bits (msb) and least significant bits (lsb) CRCs are coded in msb/lsb bits to match CRC bit "quality" to corresponding data bit quality. Thus, a receiver can determine if it has received the msb correctly even if there are errors in the lsb. In one embodiment the msb CRC covers the 4 most significant bits in each byte and the lsb CRC covers the least significant bits in each byte.

Separate msb/lsb can be used in systems using either Unequal Error Protection (UEP) or conventional Equal Error Protection (EEP). UEP is a well-known technique to code certain bits with greater robustness than other bits. In one embodiment, the assignment of bits to different error protection levels in UEP corresponds to the assignment of bits to the msb and lsb CRCs. Separate CRCs can be used in both UEP and EEP packets to make the architecture more regular.

Each sub-packet has one "ACK group" bit which indicates if it should be in same ACK group as previous sub-packets. The first sub-packet does not need an "ACK group" bit but can include one. This allows grouping of several sub-packets into a single ACK bit to reduce the number of ACK bits required and allow greater efficiency. In one embodiment, up to 7 sub-packets are mapped to up to 5 ACK bits. Another bit in the "ACK group" byte indicates if ACKs should be generated for packets just matching msb CRC or both msb and lsb CRC. In one embodiment, for EEP packets msb and lsb CRCs are used in ACK, while for msb-only packets, only msb CRC is used.

MAC Frame Format Layered for Independent PHY and MAC Processing

HRP packets consist of one or more sub-packets. Each sub-packet can have a different Modulation Coding Scheme (MCS). In one embodiment, for greater efficiency, adjacent sub-packets using same MCS are kept together in PHY and the PHY only tails of and pads out sub-packets of different rate/coding. Lengths only specified in single place in header.

In one embodiment, EEP is used for Audio, Data, Control, and Video sub-packets, UEP MSB-only Retry is used for Video sub-packets, and UEP is used for Video sub-packets. Full efficiency of three segment EEP/UEP-MSB/UEP structure is maintained by tailing off between the three regions while full flexibility is retained to accommodate other combinations.

Within the HRP the MAC related sections are separated out to create two uniform levels of Sub-packet grouping and Ack grouping and is used for MAC processing.

In one embodiment, the format includes up to seven sub-packets per packet—each of any type. Each sub-packet has a header type information. Each sub-packet has its own CRCs (and possibly security Initialization Vector).

In another embodiment, the format includes up to seven sub-packets that are grouped into up to five ACK groups. Each Ack-group is only ACK'ed if all CRCs in group pass. However, extending ACK to 7 bits would unnecessarily increase # OFDM symbols or weaken the ACK CRC to save bits.

Figure 3:
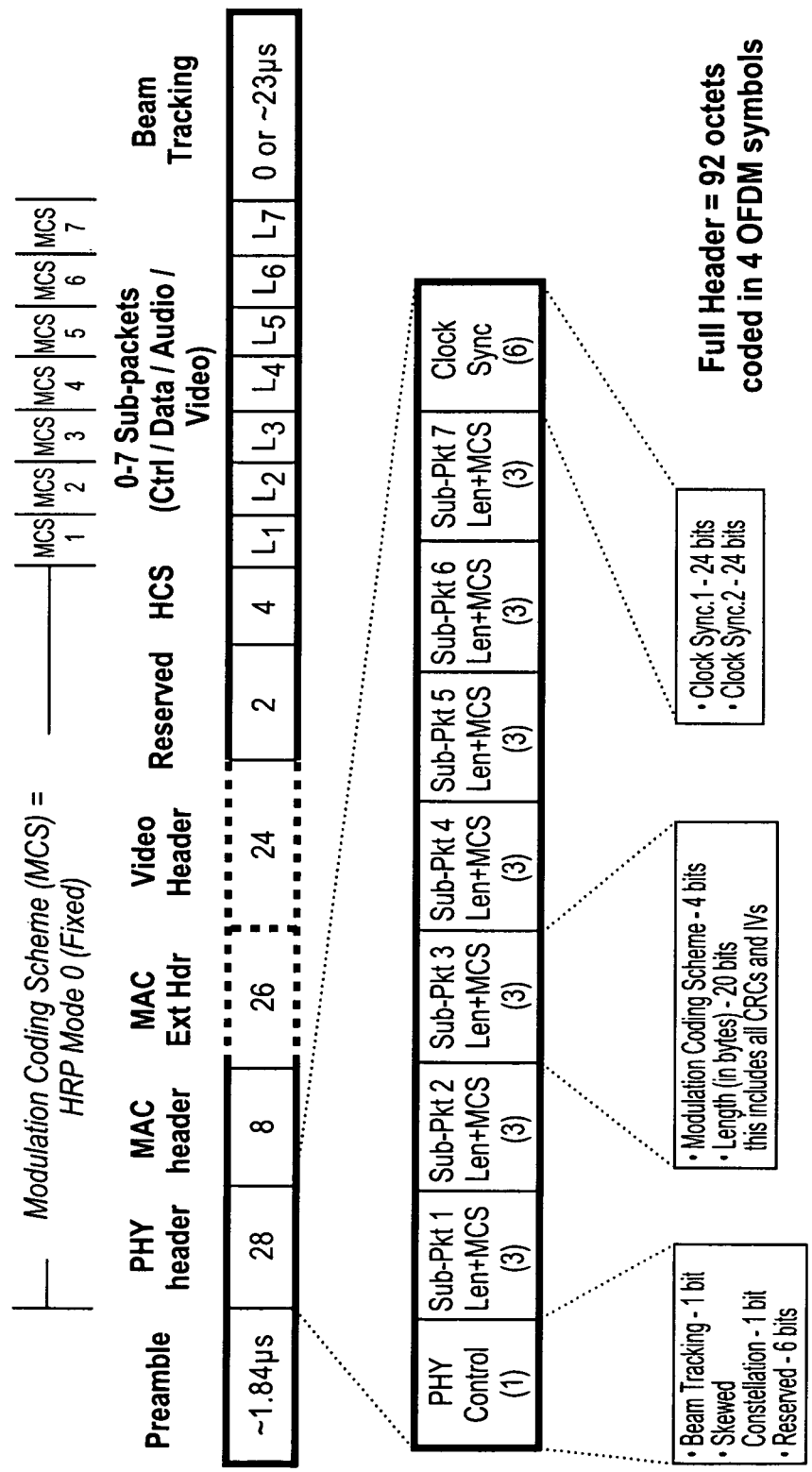
FIG. 3 is a block diagram of one embodiment of a packet format of a PHY mode segmentation.
Figure 4:
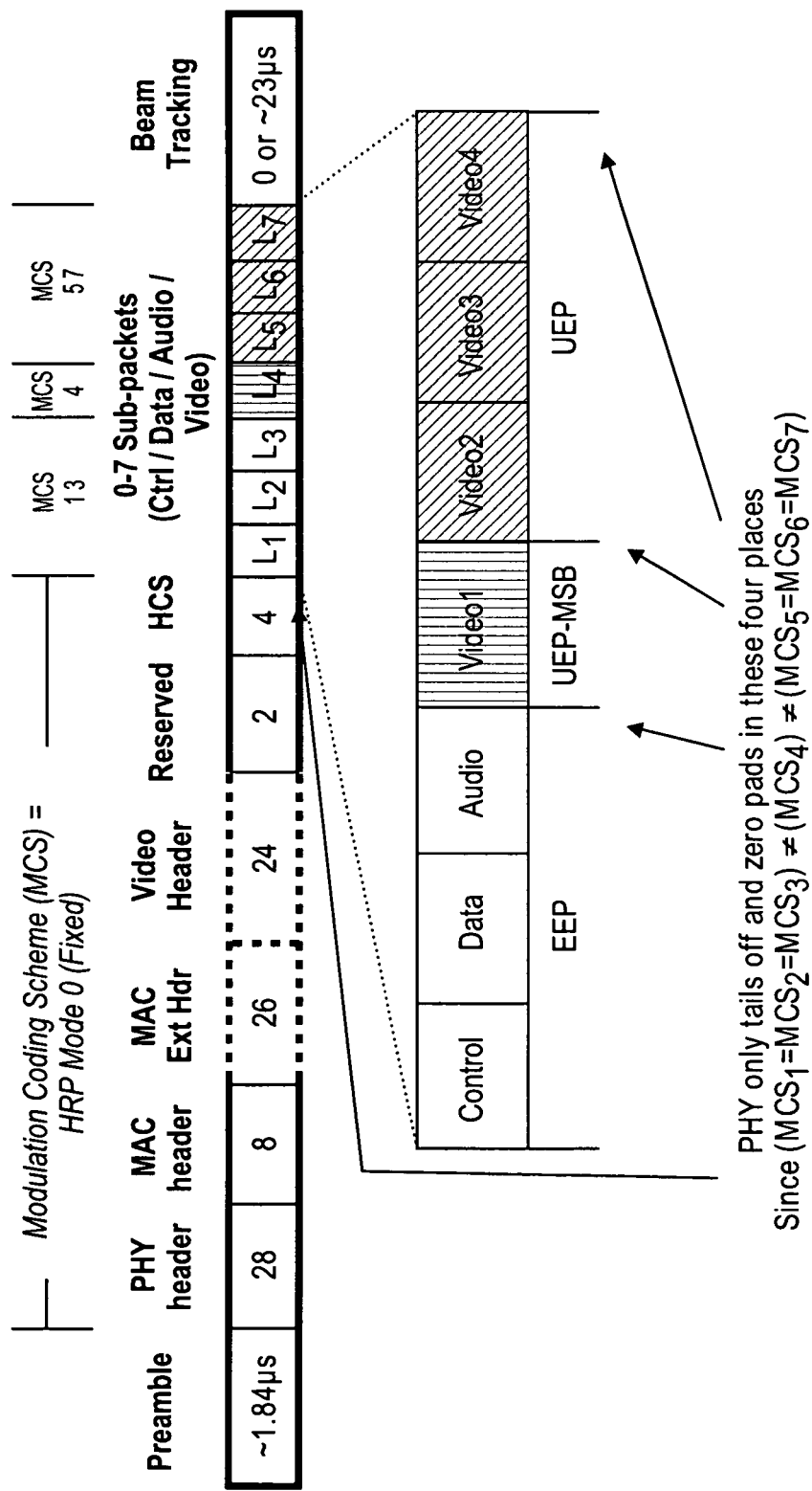
FIG. 4 is a block diagram of an example of a packet of a PHY mode segmentation.

FIG. 3 is a block diagram of one embodiment of a packet format of a PHY mode segmentation. FIG. 4 is a block diagram of an example of a packet of a PHY mode segmentation. With respect to both FIGS. 3 and 4, in one embodiment, High Rate PHY (HRP) packet consists of several regions: EEP, UEP MSB-only Retry, and UEP. EEP region include Audio, Video, and Control sub-packets. UEP MSB-only Retry and UEP include video sub-packets.

Each sub-packet can have a different Modulation Coding Scheme (MCS). For example, each sub-packet is coded at a separately specified MCS. The sub-packet MCS can be ordered from most robust to least robust.

Adjacent sub-packets using the same MCS can be kept together in PHY. PHY only tails of and pads out sub-packets of different rate/coding. Full efficiency of the three segments EEP|UEP-MSB/UEP are maintained. Other combinations can be accommodated. The lengths are only specified in a single place in the header.

Figure 5:
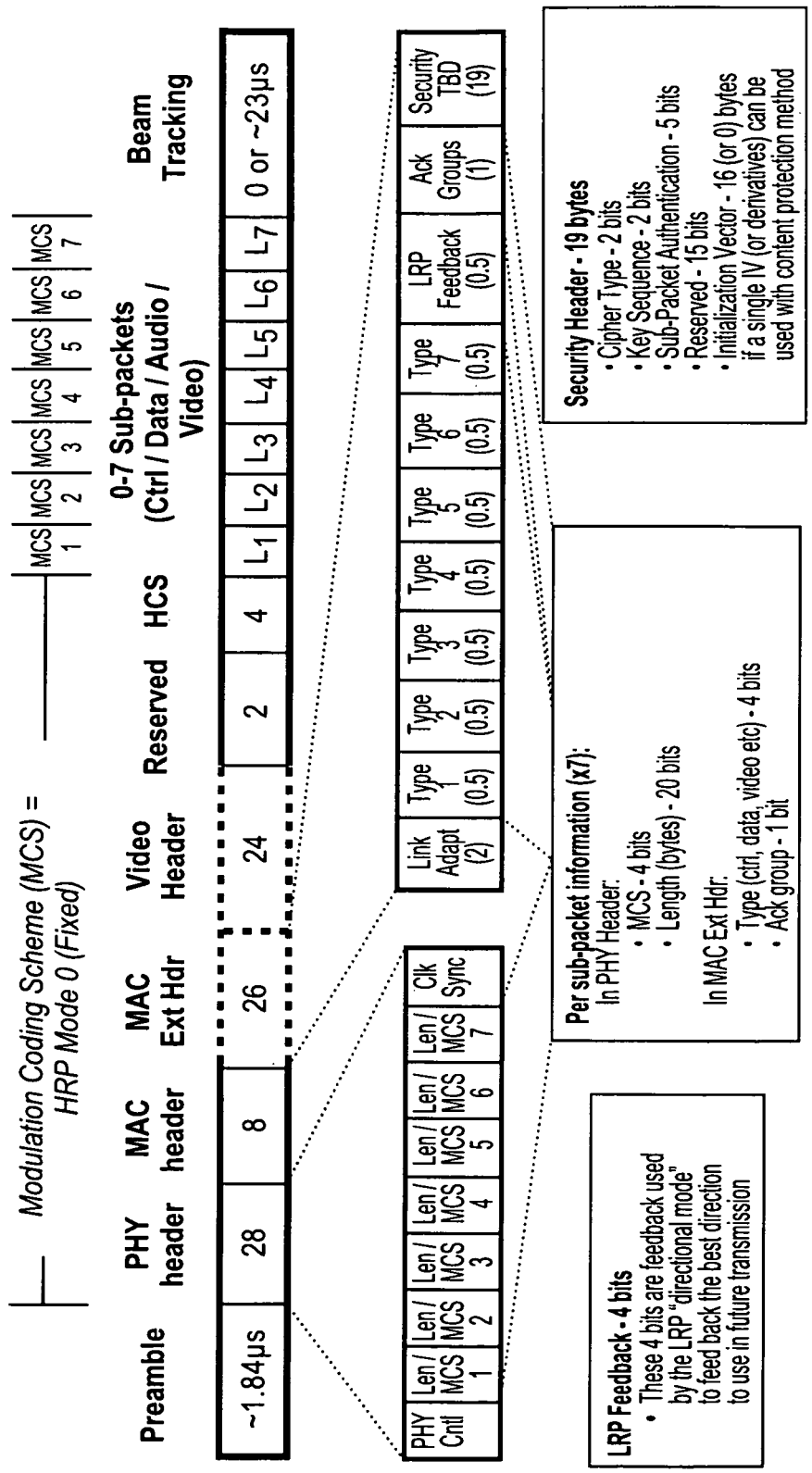
FIG. 5 is a block diagram of one embodiment of a MAC header format.

FIG. 5 is a block diagram of more detailed view of FIG. 3, showing one embodiment of PHY segmentation with separate sub-packet length/MCS pairs in a PHY header followed by sub-packet type and ack group information in a separate PHY header.

Figure 6:
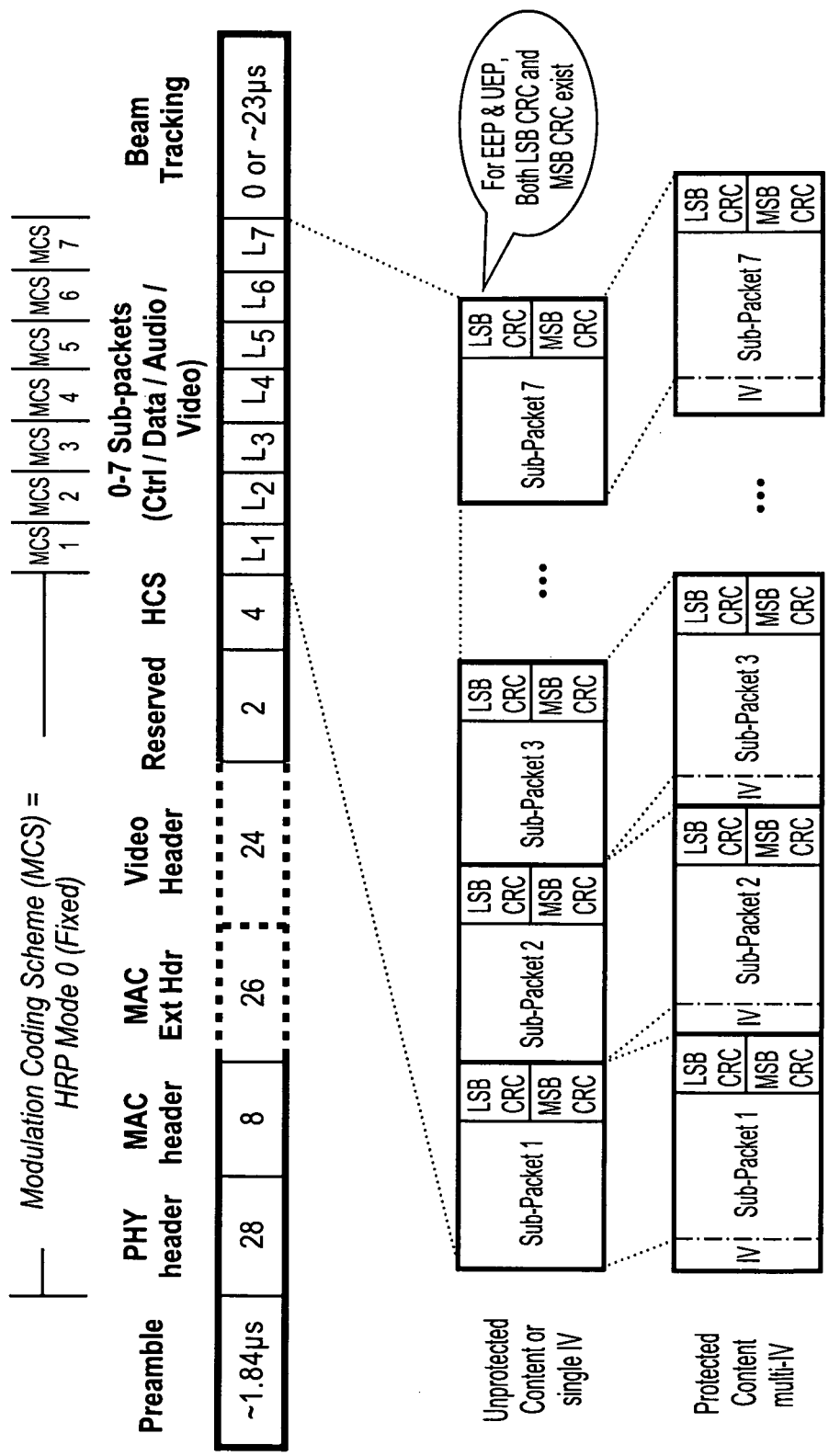
FIG. 6 is a block diagram of one embodiment of data regions of a composite packet format.

FIG. 6 is a block diagram of one embodiment of data regions of a composite packet format. Each sub-packet is followed by a pair of CRCs. In another embodiment, each sub-packet is followed by a single CRC. In one embodiment, sub-packets with protected content have the Initialization Vector preceding the sub-packet data. In another embodiment, a single IV value per packet in is placed in the packet header. In this embodiment, each sub-packet's IV could be derived from the packet IV. One embodiment derives the sub-packet IV as fixed additions to the packet IV.

In another embodiment using per sub-packet IV using a block chaining cipher (such as AES CBC), separate msb and lsb IVs are used to prevent errors in the lsbs or msbs from affecting the other set of bits. Thus the IV should cover same region as CRC. The two streams are then encrypted separately.

If a stream sipher or block cipher without chaining (i.e. AES Counter, etc) is selected, a single IV can be used for the entire stream since error propagation may not be an issue.

Unified Aggregation/Fragmentation of Data

Figure 7:
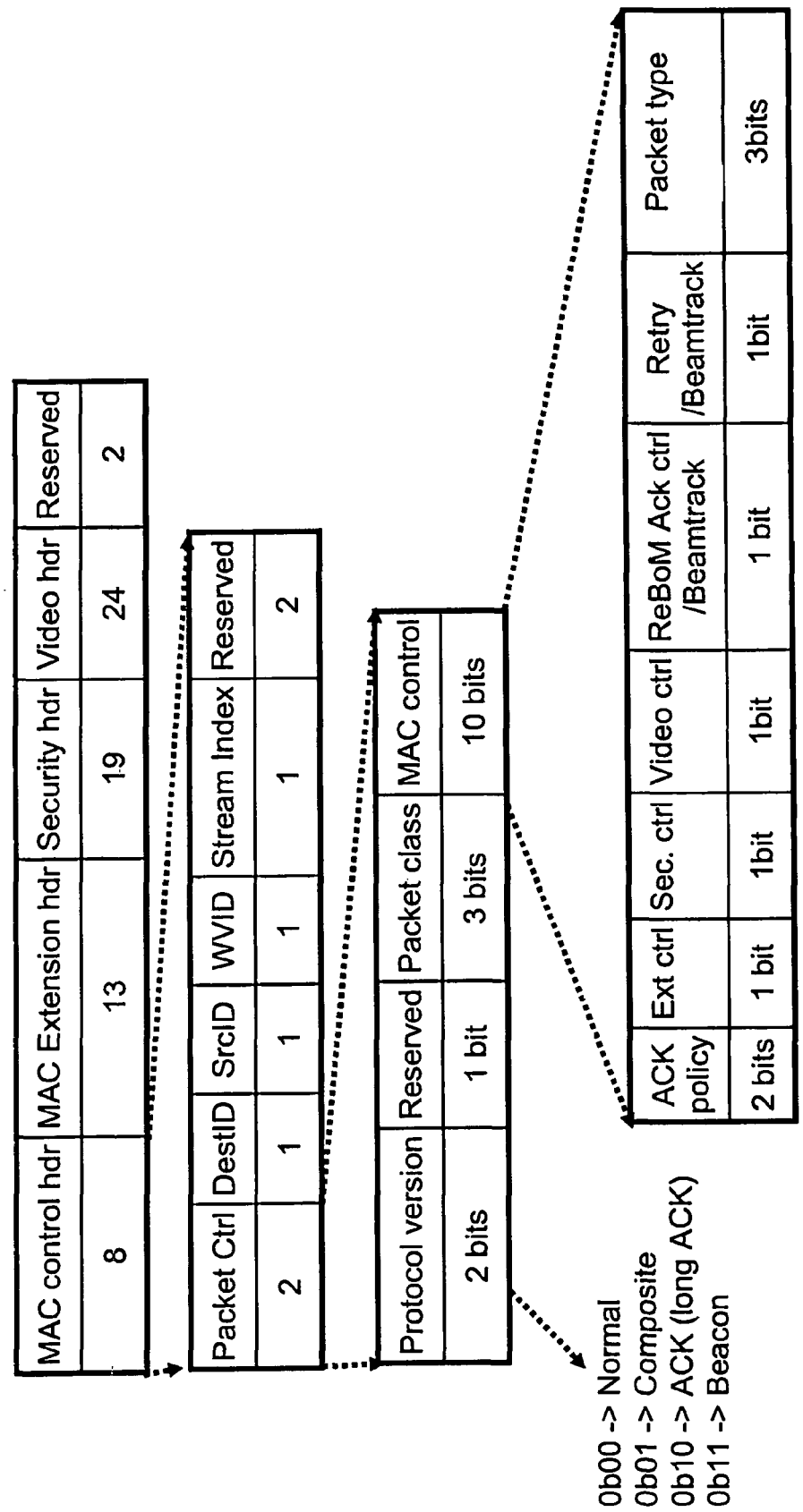
FIG. 7 is a block diagram of one embodiment of a MAC header format.

Due to the nature of beamformed and omni-directional transmissions, such as those in 60 GHz and specified in WirelessHD, devices will transmit and/or receive using both Low Rate (LR) and High Rate (HR) physical layers (PHYs). The data rates using the LR and HR PHYs can differ by over a factor of 1000. Because of this, the LR and HR PHYs carry packets of different size, ranging from less than 100 bytes on LR, to several hundred kilobytes on HR. In order to efficiently send MAC packets, it is necessary to aggregate MAC packets so that they are not too short for HR PHY transmission or too long for LR PHY transmission. Since both the LR and HR PHYs are used in the same devices and system, it is beneficial to have a unified scheme to perform the aggregation and fragmentation. FIG. 7 is a block diagram of one embodiment of a MAC header format capable of the unified aggregation and fragmentation using the following specification.

The packet or sub-packet's payload can contain one or multiple sub-payloads:

| Octets: variable | Variable | ... | Variable |
|---|---|---|---|
| Sub-payload 1 | Sub-payload 2 | ... | Subpayload N |

The sub-payload field at the start of the sub-payload allows a unitied approach to handle fragments of a MSDU or an aggregate of MSDUs (MAC service data unit) in the packet.

Sub-Payload Field

| Bits: 20 | 10 | 1 | 1 | Variable |
|---|---|---|---|---|
| Length | Sequence number | Last fragment | First fragment | MSDU |

The Length field indicates the length of the MSDU. The sequence number field is incremented for each MSDU. The key is the fragment fields which indicate whether it is a fragment or a complete MSDU.

| Fragment type | Last fragment field | First fragment field |
|---|---|---|
| First fragment | 0 | 1 |
| Last fragment | 1 | 0 |
| Middle fragment | 0 | 0 |
| Complete MSDU | 1 | 1 |

Inter-Packet Period (IPP)

The HRP, LRP Short-Omni and LRP Beam-forming packets may be shortened for efficiency reasons. Because of this, it would be harder to recover timing and detect start of packets in a Channel Time Block (CTB) in case of packet header losses. To overcome this challenge, IPP is used to determine the start of packets within a multi-packet CTB. This establishes well-known synchronization points in time for the receiver to look for a packet header.

IPP can be determined as follows:

IPP=Packet Duration+ACK duration+2*SIFS Duration.

Once the IPP is established, the beginnings of packets can be expected at:

CTBtime+$n$*IPP where n is an integer greater than or equal to 0 such that the end of the last packet is within the CTB.

Dynamic Resizing of Beacon Packet

Time Division Multiple Access (TDMA) systems, such as those that can be used in the present invention, often schedule data and control packets such as beacons at static or semi-static intervals to allow greater robustness. Beacons can consist of Informational Elements (IE) which carry the information. However, the beacons sometimes need to carry additional IEs that would extend past their normal length. The conventional approach is to increase the length of the beacon always. However, this decreases overall efficiency. In one embodiment, when a longer beacon is needed, the packet scheduled to immediately follow it is not transmitted, instead allowing the beacon to extend into the suppressed packet's time slot. In one embodiment, the packet scheduled to immediately follow the beacon is the Random Access Time Block (RATB).

Data Delivery Coordination

Data delivery has an interlocked relationship with the MAC schedule, A/V composite packet format and beam search operation. The receiver in the network has to have knowledge of when the transmitter is sending data packets versus beam search packets. In case of lost transmission over the wireless link, the receiver should be able to recover and synchronize at the next packet boundary. So with the definition of Inter Packet Period (IPP) within a Channel Time Block (CTB), the receiver knows the points of intercept for packet reception. Additionally when the receivers acknowledges the transmitter of packet reception the ACK packet are defined to be received at a specific time enabling the transmitter to detect when ACK packets are lost.

In the case of Beam Search and Beam Track packets, they follow the rule of a Single IPP (Beam Track) or Multiple IPP (Beam Search) boundaries.

Optimized Preamble in MAC Frames

Long omni preamble and short omni preamble are effectively used to achieve both timing recovery and synchronization in the WiHD Network. Long omni LRP preamble allows blind timing recovery (i.e. for beacons). Short omni LRP preamble only allows limited timing adjustment (for efficiency). The usage of these preambles has been optimized so as to provide accurate timing recovery as well reduced overhead due to preamble length. Long Omni LRPDU format is used for beacons and unscheduled packets while Short Omni LRPDU format is used for contention period, scheduled packets.

In one embodiment, two versions of the omni LRPDU are defined: the long omni LRPDU which uses the long omni LRP preamble, ~56.5 µs duration, and the short omni LRPDU which uses the short omni LRP preamble, ~43.1 µs duration. The long omni LRPDU is used for beacons and unscheduled LRP packets while the short omni LRPDU is used for packets sent during a contention period or any other scheduled LRP packet.

In the description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer.

Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
   a media access controller (MAC) for generating a composite packet having a format configurable to carry one or more of audio, video and data traffic, a header portion of the composite packet encoded separately from a data portion of the composite packet, wherein the composite packet includes a plurality of sub-packets each sharing a common MAC header and a PHY header, wherein at least a first sub-packet of the plurality of sub-packets in the composite packet is encoded according to a first Modulation Coding Scheme (MCS) that encodes the first sub-packet according to a first data rate and a first level of robustness, and wherein at least a second sub-packet of the plurality of sub-packets in the composite packet is encoded according to a second MCS different than the first MCS, the second MCS encoding the second sub-packet according to second data rate lower than the first data rate and a second level of robustness higher than the first level of robustness;
   a physical device interface (PHY) coupled to the MAC, the PHY to encode and decode between a digital signal and a modulated analog signal, the PHY comprising a high rate physical layer circuit (HRP) and a low rate physical layer circuit (LRP), wherein the HRP supports a data rate greater than or equal to one gigabit per second and the LRP supports a data rate less than one gigabit per second; and
   a radio frequency (RF) transmitter coupled to the PHY to transmit data.

2. The apparatus of claim 1 wherein the composite packet includes up to seven sub-packets.

3. The apparatus of claim 2 wherein the composite packet includes four video sub-packets, one audio sub-packet, one data sub-packet, and one control subpacket.

4. The apparatus of claim 2 wherein the composite packet includes up to four video sub-packets.

5. The apparatus of claim 2 wherein a PHY header of each subpacket includes an MSC field, and a length field, wherein a MAC Ext Header of each sub-packet includes a type of sub-packet field and an ACK field.

6. The apparatus of claim 2 wherein the first and second levels of robustness are based on an error tolerance of the type of traffic.

7. The apparatus of claim 1 wherein the media access controller furthermore selects one of the first MCS or second MCS to apply based on an identified type of sub-packet, wherein the media access controller applies the first MCS to video traffic, and wherein the media access controller applies the second MCS to audio, data, and control traffic.

8. The apparatus of claim 1 wherein the composite packet includes ACK group bits for at least all but one of the sub-packets, the ACK group bits determining which sub-packets are combined into returned ACK bits.

9. The apparatus of claim 1 wherein the acknowledgement to the composite packet includes one ACK bit for each video sub-packet, and one ACK bit for audio, data, or control sub-packets.

10. The apparatus of claim 1 wherein the composite packet includes a sub-payload field comprising a length field, a sequence number field, a first fragment field, a last fragment field, and a MAC service data unit (MSDU) field.

11. The apparatus of claim 1 wherein the composite packet is transmitted using an Inter Packet Period (IPP) to determine the start of subpackets within a multi-packet Channel Time Block (CTB), the IPP determined as IPP=Packet Duration+ACK duration+2*Short Interframe Space (SIFS) Duration.

12. The apparatus of claim 1 wherein the composite packet includes a beacon packet with a beacon duration extended at the expense of a Random Access Time Block (RATB).

13. The apparatus of claim 1 wherein the composite packet includes up to seven sub-packets per packet, each sub-packet having its own type information, each sub-packet having its own CRC.

14. The apparatus of claim 1 wherein the composite packet includes up to seven sub-packets grouped into up to five ACK groups, each ACK group is only acknowledged if all CRCs in the group pass.

15. The apparatus of claim 1 wherein data delivery is coordinated between a transmitter and a receiver, the receiver knowing when the transmitter is sending data packets versus beam search packets based on a boundary of a packet.

16. The apparatus of claim 1 wherein the composite packet includes a Long Omni low rate physical layer data unit (LR-PDU) format used for beacons and unscheduled packets and a Short Omni LRPDU format used for contention period and scheduled packets.

17. A method comprising:
   generating a composite packet with a wireless HD MAC frame format configurable to carry audio, video, and data traffic;
   encoding a header portion of the composite packet separately from a data portion of the composite packet,
   wherein the composite packet includes four video sub-packets, one audio subpacket one data sub-packet, and one control sub-packet, each of the sub-packets sharing a common MAC header and a PHY header, at least a first sub-packet of the plurality of sub-packets in the composite packet is encoded according to a different Modulation Coding Scheme (MCS) that encodes the first sub-packet according to a first data rate and a first level of robustness, and wherein at least a second sub-packet of the plurality of sub-packets in the composite packet is encoded according to a second MCS different than the first MCS, the second MCS encoding the second sub-packet according to a second data rate lower than the first data rate and a second level of robustness higher than the first level of robustness.

18. The method of claim 17 further comprising: transmitting video traffic with faster and less robust MCS; and transmitting audio, data, or control traffic with slower and more robust MCS.

19. The method of claim 17 wherein the acknowledgement to the composite packet includes one ACK bit for each video sub-packet, and one ACK bit for audio, data, and control sub-packets.

20. The method of claim 17 wherein the composite packet includes a sub-payload field comprising a length field, a sequence number field, a first fragment field, a last fragment field, and a MAC service data unit (MSDU) field.

21. The method of claim 17 wherein the composite packet is transmitted using an Inter Packet Period (IPP) to determine the start of sub-packets within a multi-packet Channel Time Block (CTB), the IPP determined as IPP=Packet Duration+ACK duration+2*Short Interframe Space (SIFS) Duration.

22. The method of claim 17 wherein the composite packet includes up to seven sub-packets per packet, each sub-packet having its own type information, each sub-packet having its own CRC.

23. The method of claim 17 wherein the composite packet includes up to seven sub-packets grouped into up to five ACK groups, each ACK group is only acknowledged if all CRCs in the group pass.

* * * * *